United States Patent [19]

Hirota et al.

[11] Patent Number: 4,915,720

[45] Date of Patent: Apr. 10, 1990

[54] METHOD OF AND APPARATUS FOR MOLDING GLASS ARTICLES

[75] Inventors: Shinichiro Hirota, Hachioji; Kishio Sugawara, Hamura; Tadayuki Fujimoto, Hachioji, all of Japan

[73] Assignee: Hoya Corporation, Tokyo, Japan

[21] Appl. No.: 249,179

[22] Filed: Sep. 26, 1988

[30] Foreign Application Priority Data

Sep. 30, 1987 [JP] Japan .................... 62-246216

[51] Int. Cl.⁴ ............................... C03B 23/00
[52] U.S. Cl. .......................... 65/64; 65/76; 65/268; 65/286; 65/323
[58] Field of Search ............ 65/66, 69, 76, 77, 226, 65/39, 244, 64, 246, 268, 286, 313, 318–321, 323

[56] References Cited

U.S. PATENT DOCUMENTS

| | | | |
|---|---|---|---|
| 3,951,636 | 4/1976 | Gunthner | 65/323 X |
| 4,629,489 | 12/1986 | Hirota et al. | 65/76 X |
| 4,738,703 | 4/1988 | Izumitani et al. | 65/104 X |
| 4,778,505 | 10/1988 | Hirota et al. | 65/64 X |

Primary Examiner—Robert L. Lindsay
Attorney, Agent, or Firm—Nixon & Vanderhye

[57] ABSTRACT

A method of and an apparatus for molding glass articles. A first pressing of glass preform within a mold is carried out at a first pressing position, when the glass preform has its viscosity within a range of from $10^8$ to $10^{9.5}$ poises. The mold having accommodated therein the pressed glass is transferred from the first pressing position to a second pressing position where a second pressing is carried out with respect to the pressed glass within the mold when the pressed glass has its viscosity within a range of from $10^{10.5}$ to $10^{12}$ poises.

13 Claims, 13 Drawing Sheets

METHOD OF AND APPARATUS FOR MOLDING GLASS ARTICLES

BACKGROUND OF THE INVENTION

The present invention relates to a method of and an apparatus for molding glass articles and, more particularly, to a method of molding glass articles having high configuration precision or accuracy and fine surface roughness so that grinding or polishing after press-molding can be dispensed with, and to an apparatus for carrying out the molding method. The method and apparatus are particularly suitable for molding glass lenses large in diameter and large in thickness.

In recent years, studies and researches have been conducted in which particular material is used to form a mold having an optical mirror surface, and pressmolding is carried out within non-oxidizing atmosphere, thereby obtaining lenses having an optical mirror surface necessitating no grinding or polishing after the press-molding. In this connection, U.S. Pat. No. 3,833,347 discloses the use of glassy carbon as the material of the mold. It is disclosed in U.S. Pat. No. 4,139,677 to employ SiC or $Si_3N_4$ as the material of the mold. Further, it is disclosed in U.S. Pat. No. 4,168,961 to utilize mixture of SiC and carbon as the material of the mold. According to the molding method disclosed in these U.S. patents, a glass preform within the mold is first heated to a temperature level approximate to a glass softening point, that is, a Litolton point at which the temperature level corresponds to the viscosity of $10^{7.65}$ poises. A load is then applied to the glass preform within the mold, to carry out molding of the glass preform. Subsequently, the pressed glass is cooled to a glass transition temperature or below, while the load is maintained applied to the pressed glass in order to prevent the pressed glass from being deformed. After the pressed glass has been solidified completely, the load is removed from the pressed glass. Subsequently, the mold is cooled to a low temperature level of 300 degrees C., and then the mold is opened. It is required for such molding method to carry out the above various processings at the same position, resulting in such a problem that the molding cycle time is lengthened considerably.

On the other hand, Japanese Patent Application Laid-Open No. 58-84134 discloses an example of a glass article molding method which employs a glass preform having a configuration resembling a final product. In this method, the glass preform and a mold are heated to a temperature level corresponding to a glass viscosity level within a range of from about $10^8$ to about $10^{12}$ poises. A load is then applied to the glass preform to shape the same. Subsequently, the pressed glass and the mold are cooled. The load is then removed from the pressed glass, while the glass viscosity is maintained at a value lower than $10^{13}$ poises. The pressed glass is then taken out of the mold. Also in this conventional glass article molding method, the pressed glass is cooled within the mold while the load is maintained applied to the pressed glass, until the pressed glass is solidified, similarly to the above-described method disclosed in the U.S. patents. Accordingly, the time required for the pressing step is likewise lengthened, resulting in such a problem that it is impossible to expect a great improvement in the entire molding speed.

Another method of molding glass articles is disclosed in Japanese Patent Application Laid-Open No. 61-21927. In the method, a mold is employed, which is composed of a pair of cope and drag or upper and lower mold portions. The cope and the drag are fitted in a sleeve in such a manner that at least the cope is movable toward and away from the drag. A glass preform is inserted into the mold. A pressure rod separate from the cope applies a load to the cope at a temperature level which corresponds to the viscosity of the glass preform within a range of from $10^{8.5}$ to $10^{10.5}$ poises, to press the glass preform for few seconds to several tens of seconds, thereby molding the glass preform. The press rod is then moved backward to remove the load from the pressed glass. Subsequently, while the pressed glass is maintained accommodated in the mold, the pressed glass is cooled until the glass viscosity reaches a value equal to or higher than $10^{11.5}$ poises. The method is advantageous in that, since the mold having accommodated therein the pressed glass is cooled with the load removed after the press-molding, the press step and the cooling step can be carried out at their respective positions independent of each other, thereby making it possible to raise the entire molding speed. Since, however, the glass preform is pressed only once at the temperature corresponding to the glass viscosity within the range of from $10^{8.5}$ to $10^{10.5}$ poises, a difference in temperature occurs between the surface layer of the glass preform and the interior thereof at the cooling, particularly in case where an attempt is made to obtain a glass article which is large in size and large in thickness. This results in such a problem that recesses are generated in the molded glass by shrinkage thereof.

SUMMARY OF THE INVENTION

It is therefore an object of the invention to provide a method capable of molding glass articles particularly large in size and large in thickness, having high configuration precision and high surface roughness, at high molding speed.

It is another object of the invention to provide an apparatus suitable for carrying out the method.

According to the invention, there is provided a method of molding glass articles, comprising the steps of:

preparing a mold having accommodated therein a glass preform;

carrying out a first pressing of the glass preform within the mold, at a first pressing position, when the glass preform has its viscosity within a range of from $10^8$ to $10^{9.5}$ poises; and transferring the mold having accommodated therein the pressed glass from the first pressing position to a second pressing position where a second pressing is carried out with respect to the pressed glass within the mold when the pressed glass has its viscosity within a range of from $10^{10.5}$ to $10^{12}$ poises.

It is essential for the molding method according to the invention to include the first pressing step and the second pressing step. The glass preform is pressed at the glass viscosity within the range of from $10^8$ to $10^{9.5}$ poises at the first pressing step, whereby the configuration of the glass is substantially determined. At the second pressing step at the glass viscosity within the range of from $10^{10.5}$ to $10^{12}$ poises, the glass is pressed only few micrometers to few tens of micrometers. Thus, it is possible to obtain the pressed glass having the specific configuration and the central thickness with a predetermined tolerance. Moreover, when a glass article large in size and large in thickness is molded, if only the first pressing step of pressing the glass preform is carried out at the viscosity within the range of from $10^8$ to $10^{9.5}$ poises, recesses are generated in the pressed glass by shrinkage thereof at the subsequent cooling step. If, however, the glass is pressed at the viscosity within the range of from $10^{10.5}$ to $10^{12}$ poises at the second pressing step and, subsequently, is cooled, it is possible to prevent the recesses from being generated in the pressed glass due to shrinkage thereof.

Further, according to the method of the invention, the first pressing step and the second pressing step are carried out respectively at the first pressing position and the second pressing position which are different from each other. Accordingly, the use of a plurality of molds enables glass articles to be molded continuously by a single molding apparatus, making it possible to raise considerably the productivity of the glass articles.

Moreover, according to the method of the invention, after the first pressing step, the mold having accommodated therein the pressed glass to be molded is transferred to the second pressing step without the pressed glass material being taken out of the mold, and the second pressing step is carried out at the second pressing position. Thus, there is no such anxiety that the central axis of the pressed glass is shifted or deviated from a regular position.

Preferable flow of the glass article molding method of the invention which includes the abovementioned two pressing steps will next be described, inclusive of other accompanying steps.

(1) Preparatory Step:

The mold is prepared, in which a pair of cope and drag or upper and lower mold portions are fitted in a sleeve in such a manner that at least the cope is slidable toward and away from the drag. A glass preform to be molded is put into a cavity within the mold, at a location outside of an apparatus for molding glass articles.

(2) Heating Step:

The mold is introduced into the molding apparatus through an insertion chamber thereof. The mold is then heated, at a heating position, to such a temperature level that the viscosity of the glass preform is brought to a value within the range of from $10^8$ to $10^{9.5}$ poises. By this heating treatment, the glass preform is brought to such a state as to have the viscosity suitable for the pressing at the subsequent first pressing step. In this connection, the mold and the glass preform may be heated separately from each other, if possible.

(3) First Pressing Step:

The mold is moved to the first pressing position where the first pressing is carried out when the viscosity of the glass preform is within the range of from $10^8$ to $10^{9.5}$ poises. Subsequently, the pressure is removed from the pressed glass. By this pressing treatment, the thickness at the center of the pressed glass is determined substantially.

(4) First Cooling Step:

The mold is moved to a first gradual cooling position where the pressed glass is cooled in such a manner that the glass viscosity is brought to a value within the range of from $10^{10.5}$ to $10^{12}$ poises. For instance, if a lens having a large thickness and an outer diameter equal to or larger than 15 mm is cooled, the surface layer of the pressed glass is first cooled, and cooling of the interior of the pressed glass is delayed, so that slight recesses tend to be generated in the pressed glass due to shrinkage thereof. Thus, it is necessary that the pressed glass is soaked after the cooling, and the subsequent second pressing step is then carried out. In this connection, the first gradual cooling position may be dispensed with as the case may be. That is, the pressed glass may be cooled after the pressing at the preceding first pressing position, or before pressing at the subsequent second pressing position.

(5) Second Pressing Step:

The mold is transferred to the second pressing position where the second pressing is carried out at a substantially constant temperature level corresponding to the glass viscosity within the range of from $10^{10.5}$ to $10^{12}$ poises. Subsequently, the pressure is removed from the pressed glass. By this pressing treatment, the pressed glass is further pressed slightly. Thus, the pressed glass is obtained, which has a configuration corresponding to that of the cavity within the mold.

(6) Second Cooling Step:

The mold is transferred to a second gradual cooling position where the mold as well as the pressed glass therewithin is cooled. It is convenient or preferable that, at this second cooling step, the pressed glass within the mold is cooled while the own weight of the cope is maintained applied to the pressed glass, until the temperature of the pressed glass is brought to a level lower, by 10 degrees C. or more, than the transition temperature Tg of the glass material, which corresponds to the viscosity of $10^{13}$ poises. By doing so, the pressed glass within the mold is contracted uniformly. As a result, the pressed glass is well released from the mold at the succeeding mold releasing step (7), making it possible to obtain a glass article having high surface precision.

(7) Mold Releasing Step:

The mold is brought out of the apparatus through a takeout chamber, and the glass article is taken out of the mold. The mold releasing step may, if possible, be carried out in such a manner that the glass article is taken out of the mold within the apparatus, or in such a manner that the mold taken out of the apparatus is further cooled and, subsequently, the glass article is taken out of the mold.

Saying in addition, the glass preform or the pressed glass is maintained accommodated in the mold composed of the pair of cope and drag and the sleeve, during the steps (3) through (6). Further, the steps (2) through (6) are carried out within the atmosphere of inert gas or non-oxidizing gas.

According to the invention, there is also provided an apparatus for molding glass articles, comprising:

transport means for transporting a mold having accommodated therein a glass preform, along a predetermined transport path;

first temperature regulating chamber means through which the predetermined transport path extends, the first temperature regulating chamber means regulating temperature of the glass preform within the mold so as to bring viscosity of the glass preform to a value within a range of from $10^8$ to $10^{9.5}$ poises;

first press chamber means through which the predetermined transport path extends, the first press chamber means being arranged downstream of the first temperature regulating chamber means with reference to a transport direction of the mold, the first press chamber means defining a first pressing position on the predetermined transport path, the first press chamber means having pressing means for pressing the glass preform within the mold transported from the first temperature regulating chamber to the first pressing position by the transport means;

second temperature regulating chamber means through which the predetermined transport path extends, the second temperature regulating chamber means being arranged downstream of the first press chamber means with reference to the transport direction of the mold, the second temperature regulating chamber means regulating the temperature of the pressed glass within the mold so as to bring the viscosity of the pressed glass to a value within a range of from $10^{10.5}$ to $10^{12}$ poises;

second press chamber means through which the predetermined transport path extends, the second press chamber means being arranged downstream of the second temperature regulating chamber means defining a second pressing position on the predetermined transport path, the second press chamber means having pressing means for pressing the pressed glass within the mold transported from the second temperature regulating chamber means to the second pressing position by the transport means; and third temperature regulating chamber means through which the predetermined transport path extends, the third temperature regulating chamber means being arranged downstream of the second press chamber means with reference to the transport direction of the mold, the third temperature regulating chamber means cooling the pressed glass within the mold transported from the second press chamber means to the third temperature regulating chamber means by the transport means.

Preferably, the transport means includes a rotary table which is rotatable intermittently about an axis of the rotary table. In this case, the predetermined transport path is circular and extends in concentric relation to the axis of the rotary table. A plurality of molds each containing the glass preform are mounted on the rotary table in at least one row along the predetermined transport path. The arrangement is such that when the rotary table rotates intermittently, the molds are transported along the predetermined transport path so as to pass successively through the various chamber means.

Preferably, the transport means includes at least one straight guide rail for guiding the molds. The guide rail defines the predetermined transport path. A push rod is provided for moving the mold along the guide rail.

Preferably, the transport means is so designed as to transport a plurality of groups of molds simultaneously along the predetermined transport path. Each group includes a plurality of molds, and each mold has accommodated therein the glass preform. The first press chamber means includes a plurality of pressing means corresponding in number to the plurality of molds in each group, and the second press chamber means includes a plurality of pressing means corresponding in number to the plurality of molds in each group.

Preferably, the mold includes a sleeve, and a pair of cope and drag or upper and lower mold portions fitted in the sleeve. The pressing means of the first press chamber means can be abutted against an end face of the sleeve so as to restrict a pressing stroke of the pressing means of the first press chamber means.

Preferably, the first temperature regulating chamber means includes a heating chamber and a soaking chamber which are arranged in the mentioned order with reference to the transport direction of the mold. Further, preferably, the second temperature regulating chamber means includes a gradual cooling chamber and a soaking chamber which are arranged in the mentioned order with reference to the transport direction of the mold. Moreover, preferably, the third temperature regulating chamber means includes a gradual cooling chamber and a rapid cooling chamber which are arranged in the mentioned order with reference to the transport direction of the mold.

Figure 7:
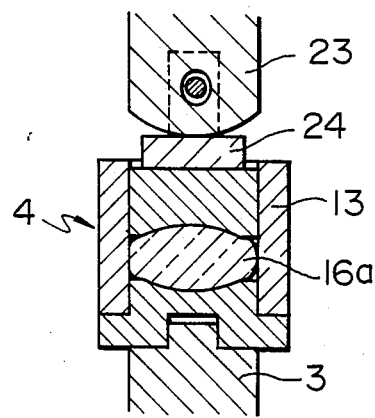
FIG. 7 is a fragmentary enlarged vertical cross-sectional view of the mold and a part of pressing means within a second press chamber.
Figure 8A:
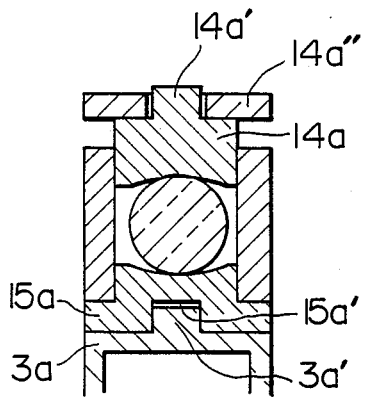
FIGS. 8A, 8B and 8C are fragmentary enlarged vertical cross-sectional views showing a modification of the mold and the part of the pressing means.
Figure 8B:
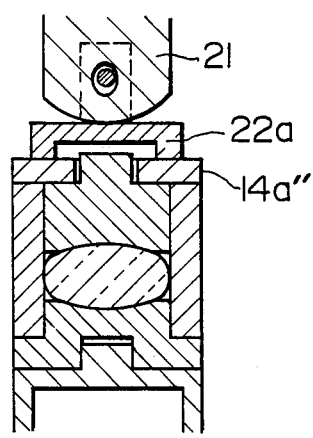
Figure 8C:
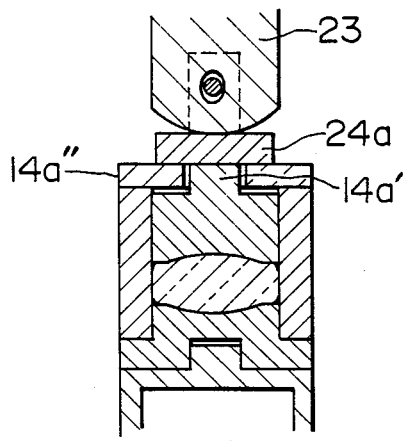
Figure 12A:
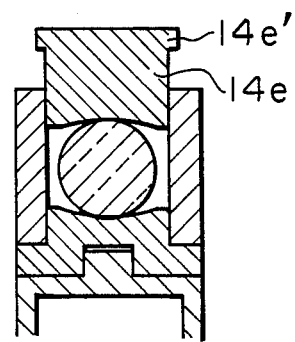
Figure 12B:
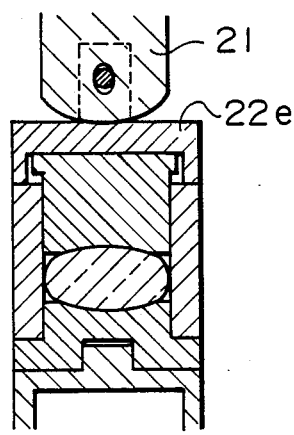
Figure 12C:
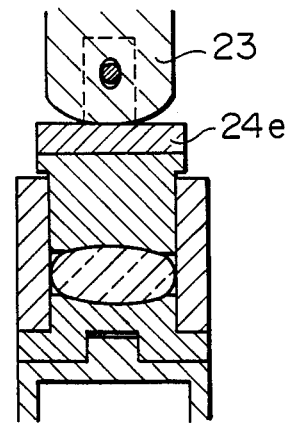
Figure 13A:
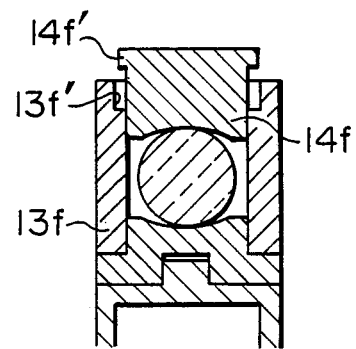
Figure 13B:
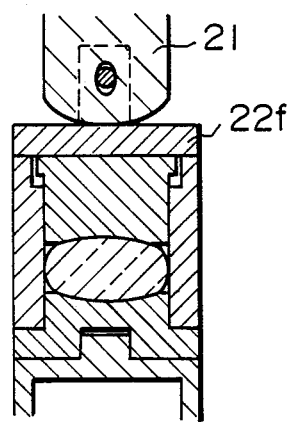
Figure 13C:
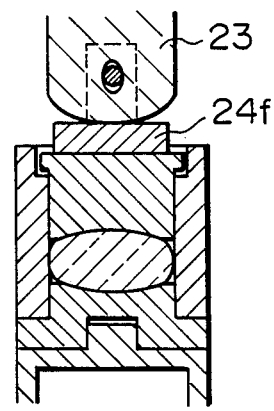
Figure 14:
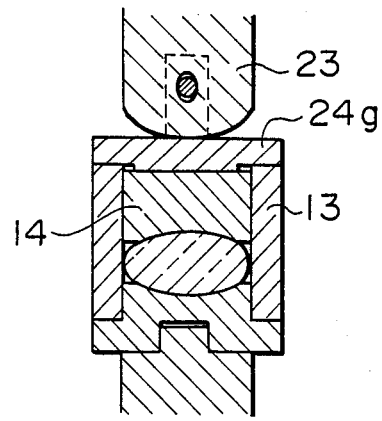
Figure 16:
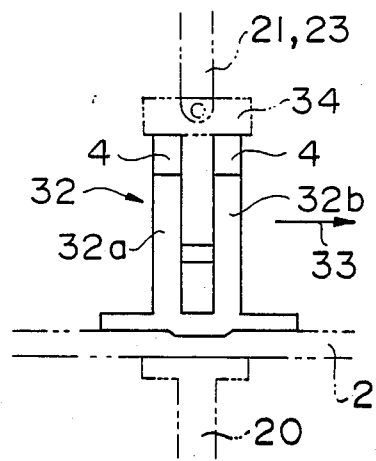
Figure 15:
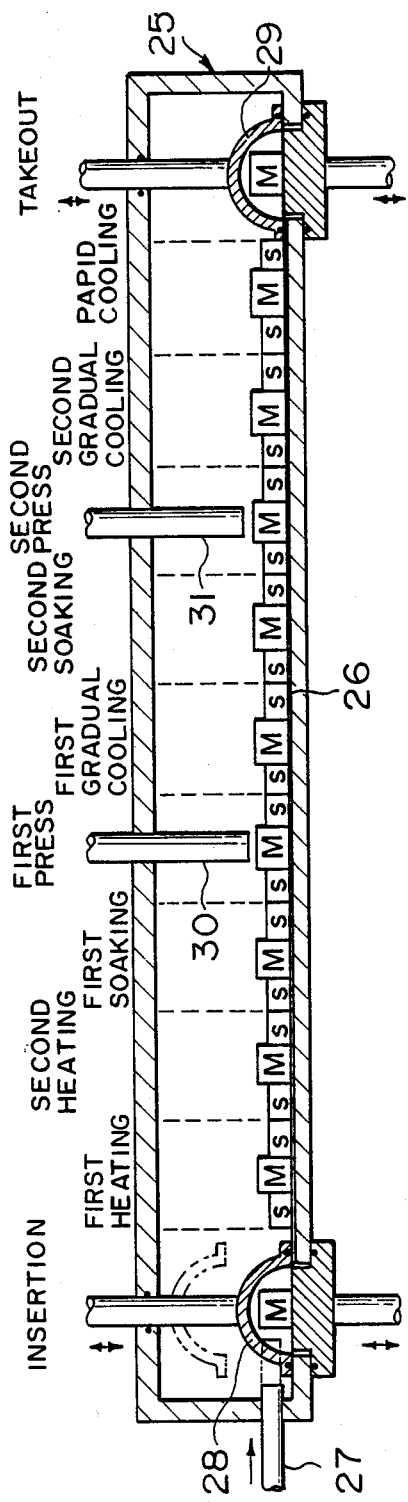

FIGS. A, 11B and 11C are views similar respectively to FIGS. 8A, 8B and 8C, but showing another modification of the mold and the part of the pressing means;

FIGS. 12A, 12B and 12C are views similar respectively to FIGS. 8A, 8B and 8C, but showing another modification of the mold and the part of the pressing means;

FIGS. 13A, 13B and 13C are views similar respectively to FIGS. 8A, 8B and 8C, but showing another modification of the mold and the part of the pressing means;

FIG. 14 is a fragmentary vertical cross-sectional view of a modification of pressing means illustrated in FIG. 7;

FIG. 15 is a schematic vertical cross-sectional view of an in-line type glass article molding apparatus; and FIG. 16 is a side elevational view of a modification of the sample mount and pressurizing means, which enables a plurality of glass article to be molded simultaneously.

DETAILED DESCRIPTION

Various embodiments of the invention will be described below in detail with reference to the accompanying drawings.

In the embodiments of the invention, a glass preform to be molded is used, whose composition consists of 27.8 wt% $SiO_2$, 1.8 wt% $Na_2O$, 1.2 wt% $K_2O$, 65.2 wt% $PbO$, 2.0 wt% $Al_2O_3$, and 2.0 wt% $TiO_2$. The glass preform has its transition temperature which is 435 degrees C.

Figure 1:
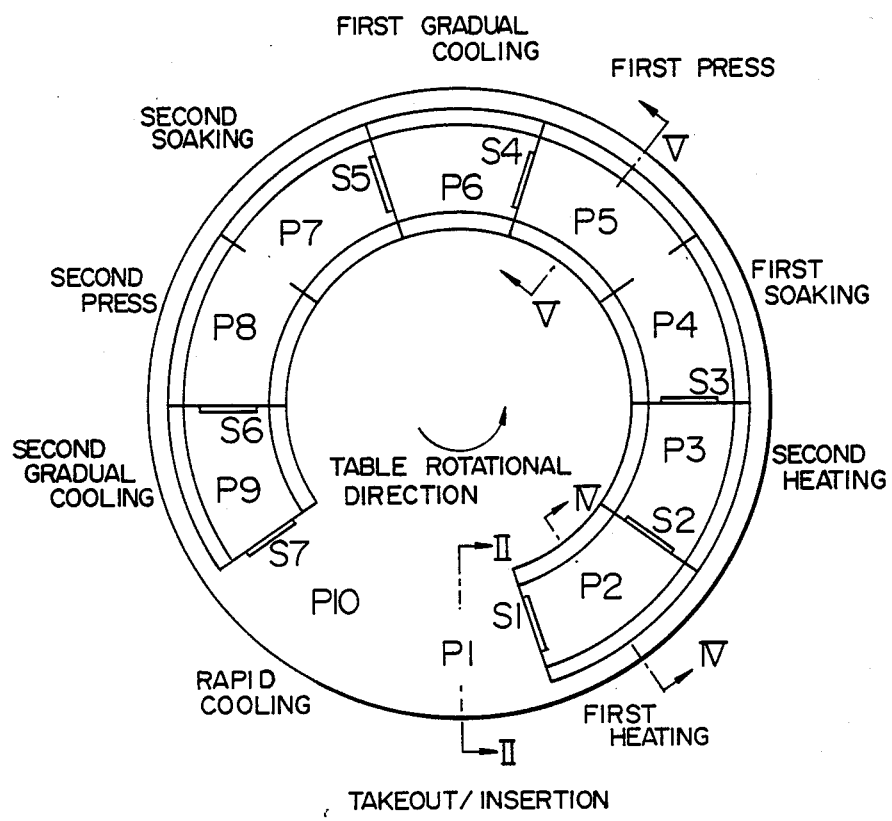
FIG. 1 is a schematic top plan view of a rotary-type glass article molding apparatus according to an embodiment of the invention.

Referring first to FIGS. 1 through 7, in particular to FIG. 1, there is shown a rotary type apparatus for molding glass articles. The apparatus comprises a takeout/insertion chamber P1, and a plurality of processing chambers P (see FIG. 2), P2, P3, P4, P5, P6, P7, P8, P9 and P10 which are arranged in order circumferentially. A plurality of molds each having accommodated therein a glass preform to be molded or a molded glass are arranged on a rotary table in a single row along a predetermined circular transport path extending in concentric relation to an axis of the rotary table. The molds arranged along the transport path are spaced from each other equidistantly. When the rotary table rotates intermittently, the molds are passed one by one successively through the processing chambers P and P2 through P10. P2 is a first heating chamber, P3 is a second heating chamber, P4 is a first soaking chamber, P5 is a first press chamber, P6 is a first gradual cooling chamber, P7 is a second soaking chamber, P8 is a second press chamber, P9 is a second gradual cooling chamber, and P10 is a rapid cooling chamber. These processing chambers are partitioned by shutters S1, S2, S3, S4, S5, S6 and S7, as shown in FIG. 1. In this connection, it is to be noted that no shutter is provided between the first soaking chamber P4 and the first press chamber P5 and between the second soaking chamber P7 and the second press chamber P8. Each of the first heating chamber P2, the second heating chamber P3, the first soaking chamber P4, the first gradual cooling chamber P6, the second soaking chamber P7, the second gradual cooling chamber P9 and the rapid cooling chamber P10 will be referred also to as a temperature regulating chamber, because these chambers are provided for regulation of temperature.

The construction and operation of the takeout/insertion chamber, the various processing chambers and the mold will next be described in due order.

Figure 2:
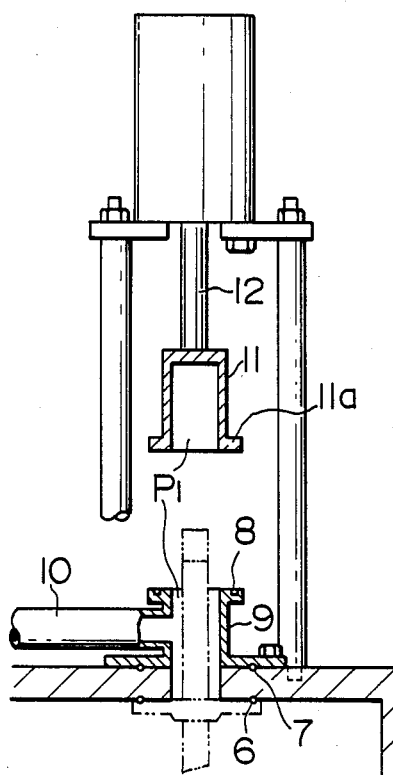
FIG. 2 is a fragmentary cross-sectional view taken along the line II—II in FIG. 1, showing a takeout/insertion chamber.
Figure 2:
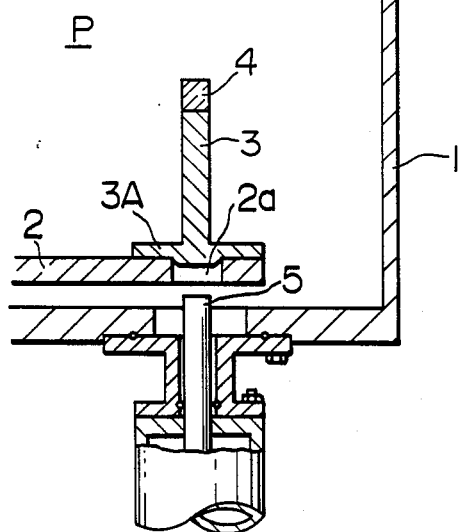

Referring to FIG. 2, there is shown the takeout/insertion chamber P1 cross-sectioned along the line II—II in FIG. 1. As shown in FIG. 2, the apparatus comprises a common furnace body 1 for the various processing chambers P, P2, P3, P4, P5, P6, P7, P8, P9 and P10. A rotary table 2 is arranged within the furnace body 1 and is driven for intermittent rotation about a central axis of the rotary table 2 by an index machine (not shown). The rotary table 2 has an outer peripheral portion thereof which is formed therein with a plurality of through bores 2a spaced from each other circumferentially equidistantly. A plurality of sample mounts 3 are fitted respectively in the bores 2a. A plurality of molds 4 each having accommodated therein a glass preform to be molded or molded glass are detachably set respectively on the tops of the sample mounts 3.

Each of the sample mounts 3 has so sufficient vertical length that the mold 4 set on the top of the sample mount 3 is located substantially at a vertical center of the processing chamber P defined within the furnace body 1 and below the takeout/insertion chamber P1. A lifting rod 5 is arranged at the processing chamber P and below the rotary table 2, for lifting the sample mount 3 up to a position indicated by the phantom lines in FIG. 2. The lifting rod 5 extends through the lower wall of the furnace body 1 and is formed by a piston rod of a piston-cylinder assembly. An 0-ring 6 is mounted to an inner surface of the upper wall of the furnace body 1. A seal mount 9 is fixedly mounted to an outer surface of the upper wall of the furnace body 1 through an 0-ring 7 which is arranged in coaxial relation to the 0-ring 6.

The seal mount 9 has an upper surface to which an 0-ring 8 is mounted. A pipe 10 has one end thereof which is connected to the seal mount 9. The other end of the pipe 10 is connected to a vacuum pump and/or a tank filled with non-oxidizing gas (both not shown). A bell jar 11 is arranged above the seal mount 9 for vertical movement between an inoperative position where the bell jar 11 is spaced upwardly away from the seal mount 9 and an operative position where the bell jar 11 is abutted against the seal mount 9 and cooperates with the same to define the takeout/insertion chamber P1. A piston-cylinder assembly has a vertically extending piston rod 12 whose lower end is connected to the bell jar 11 for vertically moving the same between the inoperative and operative positions.

Except for the time the mold 3 is introduced into the processing chamber P through the takeout/insertion chamber P1 and the time the mold 4 is taken out of the processing chamber P through the takeout/insertion chamber P1, the bell jar 11 is moved downwardly by the piston rod 12 and is abutted against the seal mount 9 to close the takeout/insertion chamber P1. The closed takeout/insertion chamber P1 is filled with non-oxidizing gas such as, for example, nitrogen supplied through the pipe 10. When the rotary table 2 is rotated intermittently, the mold 4 mounted on the sample mount 3 moves together with the rotary table 2 around the axis thereof successively through the various processing chambers. As the mold 4 moves once around the axis of the rotary table 2, molding of the glass preform accommodated in the mold 4 is completed. When the mold 4 having accommodated therein the molded glass reaches the processing chamber P below the takeout/insertion chamber P1, the lifting rod 5 moves the sample mount 3 as well as the mold 4 upwardly from the processing chamber P toward the closed takeout/insertion chamber P1. In the meantime, as indicated by the phantom lines in FIG. 2, a flange 3A of the sample mount 3 is urged against the 0-ring 6, to intercept communication between the processing chamber P and the takeout/insertion chamber P1. Subsequently, the bell jar 11 is moved upwardly away from the seal mount 9 by the piston rod 12. The mold 4 having accommodated therein the molded glass or a glass article is removed from the sample mount 3 by a gripper or the like (not shown), and the glass article is released from the mold 4. Subsequently, a succeeding mold 4, in which a glass material to be molded has already been accommodated, is set on the sample mount 3. The bell jar 11 is then moved downwardly until the flange 11a of the bell jar 11 is abutted against the 0-ring 8, to again close the takeout/insertion chamber P1. The takeout/insertion chamber P1 is once vacuum-evacuated and, subsequently, is filled with nitrogen. Then, the lifting rod 5 is moved downwardly, to lower the sample mount 3 on which the mold 4 rests, thereby fitting the mold 4 into the bore 2a in the rotary table 2. Subsequently, the shutter S1 shown in FIG. 1 is opened. It is to be noted that all the shutters S1 through S7 are opened and closed simultaneously. The rotary table 2 is moved angularly about the axis thereof by 36 degrees, to move the sample mount 3 having mounted thereon the mold 4, from the processing chamber P to the first heating chamber P2. In the illustrated embodiment, the above-mentioned operation from the point of time the mold 4 having accommodated therein the glass article reaches the processing chamber P to the point of time the succeeding mold 4 having accommodated therein the glass preform to be molded reaches the processing chamber P2 is carried out for sixty (60) seconds, for example. In this case, the stationary time of the rotary table 2 is fifty-five (55) seconds, while the time required for angular movement of the rotary table 2 by 36 degrees is five (5) seconds.

Figure 3:
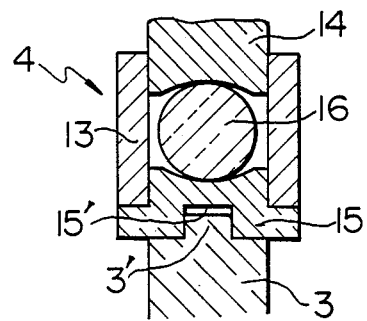
FIG. 3 is a fragmentary enlarged vertical cross-sectional view of a mold and a part of a sample mount within the takeout/insertion chamber.

As described previously with reference to FIG. 2, the mold 4 having accommodated therein the glass article is removed from the sample mount 3 by means of the gripper or the like. Subsequently, the succeeding mold 4 having accommodated therein the glass preform to be molded is mounted to the sample mount 3, and the sample mount 3 as well as the mold 4 is introduced into the processing chamber P. FIG. 3 shows the mold 4 introduced into the processing chamber P, the glass preform to be molded within the mold 4, and a part of the sample mount 3. The mold 4 comprises a sleeve 13, and a pair of cope and drag or upper and lower mold portions 14 and 15. The cope 14 is fitted in the sleeve 13 for movement toward and away from the drag 15. A glass preform 16 to be molded is placed between the cope 14 and the drag 15. The drag 15 has its outer bottom face formed therein with a recess 15'. On the other hand, the sample mount 3 has its top formed with a projection 3'. The mold 4 is set on the sample mount 3 in such a manner that the projection 3' is fitted into the recess 15' in the drag 15. The projection 3' and the recess 15' are formed to have a predetermined common size, so that the same sample mount 3 can be used for various molds 4 different in size and kind or type from each other.

Figure 4:
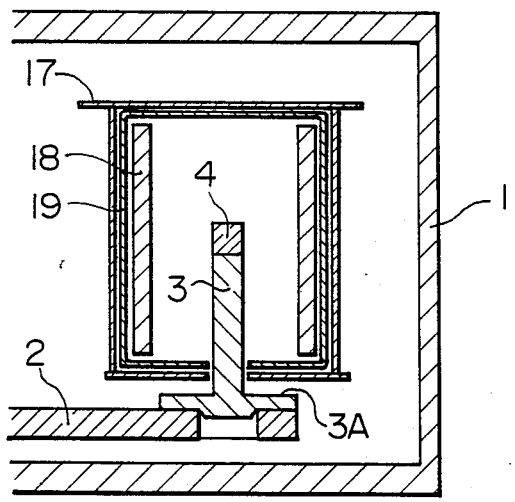
FIG. 4 is a cross-sectional view taken along the line IV—IV in FIG. 1, showing a first heating chamber.

FIG. 4 is a cross-sectional view of the first heating chamber P2. It is to be noted that the second heating chamber P3, the first soaking chamber P4, the first gradual cooling chamber P6, the second soaking chamber P7 and the second gradual cooling chamber P9 are different in temperature from the first heating chamber P2, but are the same in construction as the first heating chamber P2. As shown in FIG. 4, a case 17 is fixedly mounted to the furnace body 1 in a manner which is not shown. A heater 18 and a reflector 19 are arranged within the case 17. As described previously, the sample mount 3 has the sufficient vertical length so as to facilitate heating of the mold 4, that is, so as to locate the mold 4 at a vertically central position within the heating chamber P2. It is preferable that a water cooling mechanism (not shown) is arranged within the rotary table 2 in order to prevent the lower section of the sample mount 3 from being heated excessively. Alternatively or additionally, a heat-insulating plate (not shown) may be arranged on the upper surface of the flange 3A to prevent the lower section of the sample mount 3 from being brought to a high temperature level. Although not shown, a thermocouple is arranged within the projection 3' (see FIG. 3) on the forward end of the sample mount 3. A lead line from the thermocouple extends through the central shaft of the rotary table 2, and is connected to an instrument for measuring temperature of the forward end of the sample mount 3, that is, the bottom of the mold 4.

The first heating chamber P2 is kept at high temperature of 750 degrees C., so that the glass preform 16 within the mold 4 is heated rapidly. The mold 4 as well as the glass preform 16 is maintained stationary within the first heating chamber P2 for fifty-five (55) seconds. Subsequently, the shutter S2 is opened, and the rotary table 2 is moved angularly by 36 degrees. Thus, the mold 4 as well as the glass preform 16 is moved to the second heating chamber P3. By heating at the second heating chamber P3 kept at 600 degrees C., the mold 4 as well as the glass preform 16 approaches a press temperature level. Subsequently, the mold 4 and the glass preform 16 are soaked at 500 degrees C. within the first soaking chamber P4, to bring the viscosity of the glass preform 16 to $10^{8.7}$ poises. The mold 4 is then transferred to the first press chamber P5.

Figure 5:
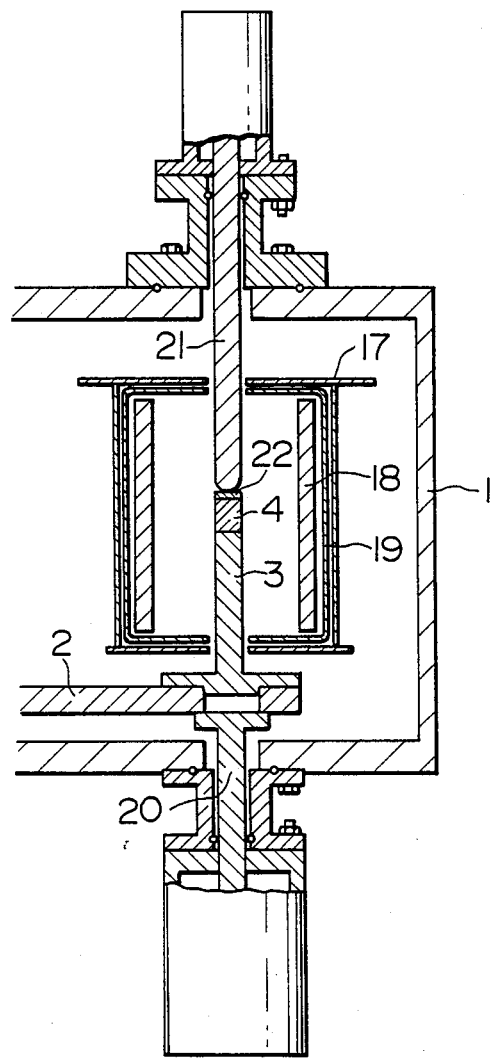
FIG. 5 is a cross-sectional view taken along the line V—V in FIG. 1, showing a first press chamber.
Figure 6:
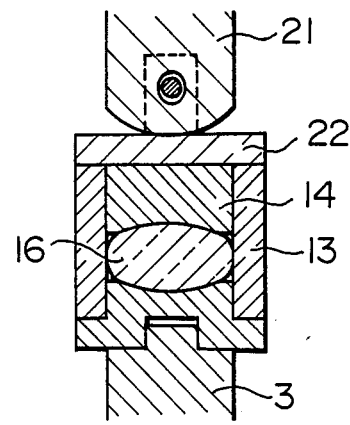
FIG. 6 is a fragmentary enlarged vertical cross-sectional view of the mold and a part of pressing means within the first press chamber.

The cross-sectional shape of the first press chamber P5 is shown in FIG. 5. The first press chamber P5 comprises a support rod 20 for supporting the rotary table 2 from below, and a pressing rod 21 for pressing the mold 4 as well as the glass preform 16 therewithin, in addition to the heater 18 and the reflector 19 which are arranged within the case 17. The support rod 20 and the pressing rod 21 are formed respectively by piston rods of piston-cylinder assemblies. The pressing rod 21 has its lower end to which a pressure plate 22 is mounted as shown in FIG. 6. The pressure plate 22 is so designed as to be abutted against the upper edge of the sleeve 13 at the first-step pressing. For this purpose, the pressure plate 22 has a diameter larger than an inner diameter of the sleeve 13. Abutment of the pressure plate 22 against the upper edge of the sleeve 13 restricts the pressing stroke at the first-step pressing.

When the mold 4 and the sample mount 3 coming from the first soaking chamber P4 become stationary within the first press chamber P5, the support rod 20 is moved upwardly to support the rotary table 2. On the other hand, the pressing rod 21 is moved downwardly to carry out a first pressing in which the glass preform 16 maintained at the viscosity of $10^{8.7}$ poises is pressed at 60 kg/cm$^2$ for forty-five (45) seconds. At this time, as shown in FIG. 6, the pressure plate 22 mounted to the pressing rod 21 is abutted against the upper end face of the sleeve 13, to restrict the first pressing stroke, so that the thickness of the pressed glass 16 is brought to a predetermined value. At this stage, the peripheral portion of the pressed glass 16 is not fully drawn, but slight gaps are left along the peripheral portion of the pressed glass 16.

Subsequently, the pressing rod 21 is moved upwardly to remove the pressure from the mold 4, and the support rod 20 is moved downwardly. The shutter S4 is then opened, and the mold 4 and the sample mount 3 are transferred to the first gradual cooling chamber P6 by intermittent rotation of the rotary table 2. When the rotary table 2 is intermittently rotated just after the first pressing at the first press chamber P5, there may be a case where distortion occurs in the configuration of the pressed glass 16, if a shock is applied to the mold 4. In this connection, the apparatus according to the illustrated embodiment employs the highly accurate or precise index machine, so that substantially no shock is applied to the mold 4 during intermittent rotation of the rotary table 2.

The pressed glass 16 within the mold 4 is cooled, within the first gradual cooling chamber P6 kept at 430 degrees C., to a temperature level of approximately 456 degrees C. which corresponds to the glass viscosity of $10^{11}$ poises. At this time, the cope 14 moves under its own weight, following contraction of the pressed glass 16. Accordingly, in case of a glass article smaller in outer diameter than 15 mm and relatively small in thickness, the glass article can have its superior configuration accuracy, even if the pressed glass continues to be cooled within the first gradual cooling chamber P6. In case of a glass article in the embodiment such as, for example, a lens equal to or larger in outer diameter than 15 mm and relatively large in thickness, however, the surface layer of the pressed glass is first cooled, and cooling of the interior of the pressed glass is delayed, so that slight recesses are generated in the glass article due to a difference in shrinkage between the surface layer and the interior of the pressed glass. In order to avoid such generation of the recesses in the glass article, the invention is arranged such that the pressed glass is again soaked at 456 degrees C. within the second soaking chamber P7, and then the pressed glass is transferred to the second press chamber P8 where a second pressing is carried out when the temperature of the pressed glass is 456 degrees C., i.e., when the glass viscosity is $10^{11}$ poises. Specifically, in the second pressing, the pressed glass is further pressed at 120 kg/cm$^2$ for forty-five (45) seconds. The second press chamber P8 is constructed similarly to the first press chamber P5. As shown in FIG. 7, however, a pressure plate 24 mounted to the forward end of the pressing rod 23 is formed to have an outer diameter smaller than the inner diameter of the sleeve 13, so that the pressure plate 24 can pressurize the molded glass 16a to a position lower than that where the pressure plate 22 shown in FIG. 6 is located at the first pressing. At the second pressing, the viscosity of the molded glass 16a has already been brought to a considerably high value. Accordingly, the molded glass 16a is drawn only few micrometers to few tens of micrometers. Thus, the thickness of the molded glass 16a can be maintained within a predetermined tolerance.

Now, let it be supposed that an attempt is made to disassemble the mold 4 immediately in this state, to release the molded glass 16a from the mold 4. Then, it is impossible for weak force to release the molded glass 16a from the mold 4, because the shaped glass material 16a is in close contact with the mold 4. If the mold releasing is carried out with strong force, there is a likelihood that distortion occurs in the configuration of the molded glass 16a, and the molded glass 16a is broken. In view of such inconvenience, in the invention, the mold 4 is transferred to the second gradual cooling chamber P9 where the molded glass 16a is cooled together with the mold 4, at least to a temperature level lower, by 10 degrees C. or more, than the glass transition temperature. Thus, contraction of the molded glass 16a per se forms a gap between the molded glass 16a and the mold 4.

Further, in the illustrated embodiment, the molded glass 16a is rapidly cooled by gas blown from a rapid cooling mechanism (not shown) which is arranged within the rapid cooling chamber P10. The molded glass 16a as well as the mold 4 is then transferred to the processing chamber P. Subsequently, the mold 4 having accommodated therein the molded glass 16a is moved into the takeout/insertion chamber P1, as described previously. The temperature of the takeout/insertion chamber P1 is brought to 250 degrees C. or less for preventing the mold 4 from being oxidized. The mold 4 as well as the molded glass or a glass article 16a therein is taken out of the apparatus, and is disassembled to remove the glass article 16a from the disassembled mold 4.

In the illustrated apparatus, ten (10) sample mounts 3 are arranged on the rotary table 2 in a single circumferential row and in equidistantly spaced relation to each other, and eleven (11) or twelve (12) molds 4 are employed. The above-described operation is repeated continuously, whereby glass articles 16a are molded at such an extremely high molding speed as one per sixty (60) seconds. The thus obtained glass articles are then annealed. The glass articles after the annealing have their configuration accuracy equal to or less than two Newton rings and equal to or less than half of the astigmatism.

Various modifications of the mold 4 and the pressing rods 21 and 23 will next be described with reference to FIGS. 8A, 8B and 8C, FIGS. 9A, 9B and 9C, FIGS. 10A, 10B and 10C, FIGS. 11A, 11B and 11C, FIGS. 12A, 12B and 12C, FIGS. 13A, 13B and 13C, and FIG. 14. Each of FIGS. 8A, 9A, 10A, 11A, 12A and 13A corresponds to FIG. 3 showing the mold 4 just after having been introduced into the processing chamber P through the takeout/insertion chamber P1. Each of FIGS. 8B, 9B, 10B, 11B, 12B and 13B corresponds to FIG. 6 showing the state at the first pressing. Each of FIGS. 8C, 9C, 10C, 11C, 12C, 13C and 14 corresponds to FIG. 7 showing the state at the second pressing.

In the modification shown in FIGS. 8A, 8B and 8C, a cope 14a is provided at its upper surface with a projection 14a'. A ring-like disc 14a'' is fitted about the projection 14a'. A pressure plate 22a having a U-shaped cross-section is mounted to the forward end of the pressing rod 21. The pressure plate 22a is adapted to act upon the disc 14a'' at the first press chamber P5 (see FIG. 8B). A pressure plate 24a mounted to the forward end of the pressing rod 23 is adapted to act upon the projection 14a' which projects above the disc 14a'' (see FIG. 8C). At this time, the pressing stroke at the second pressing is restricted by abutment of the pressure plate 24a against the disc 14''. A drag 15a is formed similarly to the drag 15 shown in FIG. 3. However, a sample mount 3a provided with a projection 3a' capable of being fitted into a recess 15a' in the drag 15a is formed to have a hollow portion in order to raise the temperature rising or falling rate of the mold 4.

Figure 9A:
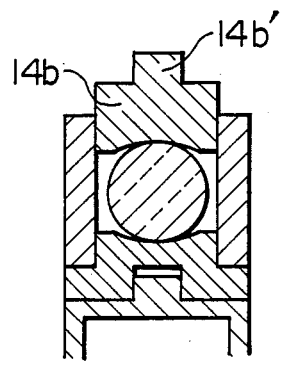
FIGS. 9A, 9B and 9C are views similar respectively to FIGS. 8A, 8B and 8C, but showing another modification of the mold and the part of the pressing means.
Figure 9B:
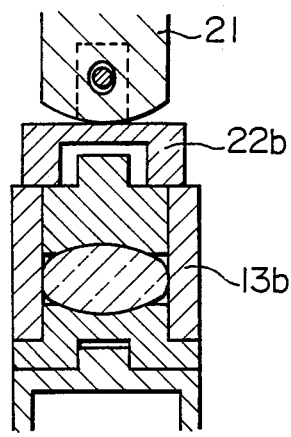
Figure 9C:
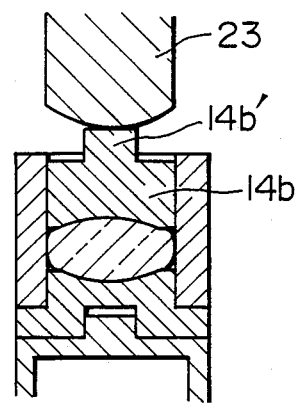

In the modification shown in FIGS. 9A, 9B and 9C, a cope 14b is likewise provided with a projection 14b'. A pressure plate 22b having a U-shaped cross-section is mounted to the forward end of the pressing rod 21. At the first press chamber P5, the pressure plate 22b is abutted against an upper end face of a sleeve 13b (see FIG. 9B). At the second press chamber P8, the forward end of the pressing rod 23 is adapted to act directly upon the projection 14b' of the cope 14b (see FIG. 9C).

Figure 10A:
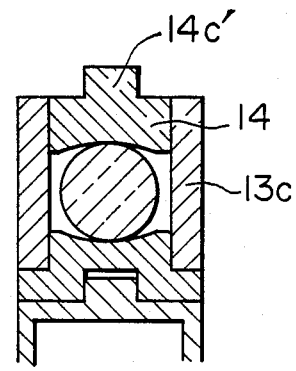
FIGS. 10A, 10B and 10C are views similar respectively to FIGS. 8A, 8B and 8C, but showing still another modification of the mold and the part of the pressing means.
Figure 10B:
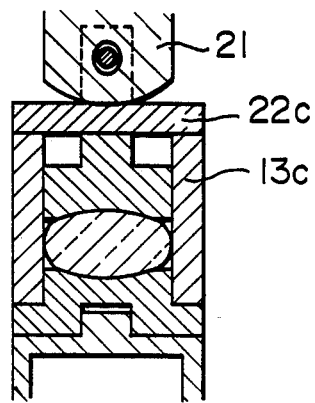
Figure 10C:
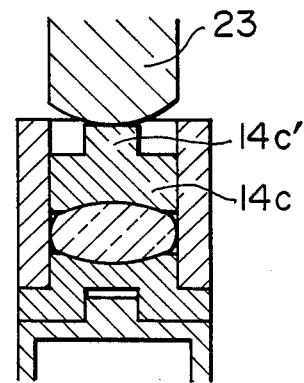

In the modification shown in FIGS. 10A, 10B and 10C, a pressure plate 22c is abutted against an upper end face of a sleeve 13c at the first press chamber P5 (see FIG. 10B). At the second press chamber P8, the forward end of the pressing rod 23 is adapted to act directly upon a projection 14c' on a cope 14c (see FIG. 10C).

Figure 11A:
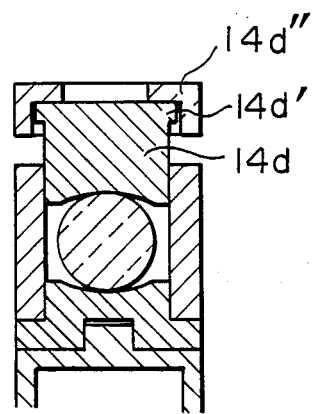
Figure 11B:
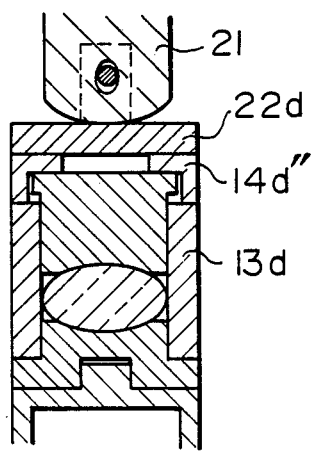
Figure 11C:
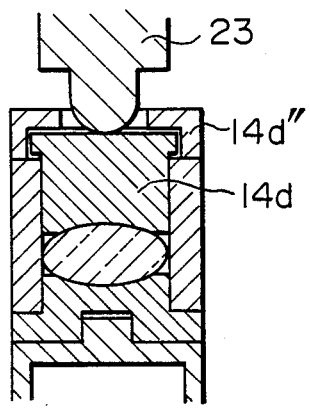

In the modification illustrated in FIGS. 11A, 11B and 11C, a cope 14d is provided at its upper end with a ring-like flange 14d'. A resting plate 14d'' having a U-shaped cross-section is mounted on the cope 14d in such a manner that the flange 14d' is fitted into the resting plate 14d''. The resting plate 14d'' is formed at its center with an opening. At the first press chamber P5, the resting plate 14d'' is pressed down by a pressure plate 22d and is abutted against an upper end face of a sleeve 13d (see FIG. 11B). At the second press chamber P8, a projection on the forward end of the pressing rod 23 is adapted to extend through the central opening in the resting plate 14d'' and to act directly upon the cope 14d (see FIG. 11C). In connection with the modification illustrated in FIGS. 14A through 14C, a gap is left, after the second pressing, between the lower face of the flange 14d' on the cope 14d and the upper end face of the sleeve 13d, in order to permit the cope 14d to move downwardly following contraction of the pressed glass at the cooling step after the second pressing.

In the modification illustrated in FIGS. 12A, 12B and 12C, a cope 14e is provided at its upper end with a ring-like flange 14e'. A pressure plate 22e having a U-shaped cross-section is mounted to the forward end of the pressing rod 21 at the first press chamber P5 (see FIG. 12B). A pressure plate 24e is mounted to the forward end of the pressing rod 23 at the second press chamber P8 (see FIG. 12C).

In the modification illustrated in FIGS. 13A, 13B and 13C, a step 13f is formed at an upper section of an inner peripheral surface of a sleeve 13f. At pressing, a ring-like flange 14f of a cope 14f is fitted in the step 13f. A relatively large-diameter pressure plate 22f is mounted to the forward end of the pressing rod 21 at the first press chamber P5, as shown in FIG. 13B. Likewise, a relatively small-diameter pressure plate 24f is mounted to the forward end of the pressure rod 24 at the second press chamber P8.

FIG. 14 shows a modification of the pressure plate illustrated in FIG. 7. In this modification, a projection is formed on a lower face of the pressure plate 24g mounted to the pressing rod 23. The projection on the pressure plate 24g is adapted to press the cope 14 down to carry out the second pressing. The pressure plate 24g has an outer diameter larger than the inner diameter of the sleeve 13, so that the pressure plate 24g is abutted against the upper end face of the sleeve 13 at the second pressing, to restrict the pressing stroke at the second pressing. Thus, the height of the projection on the pressure plate 24g determines the pressing stroke of few micrometers to few tens of micrometers at the second pressing.

The rotary-type glass article molding apparatus according to the embodiment of the invention has been described above. It is to be understood, however, that the invention is not limited to this rotary-type molding apparatus. For instance, the arrangement may be of in-line type in which processing chambers are arranged straight in a single row or in two rows, and transport means extends straight through the processing chambers. An embodiment of the glass article molding apparatus of in-line type is shown in FIG. 15. In this embodiment, various processing chambers are arranged in a single row within a furnace body 25. A plurality of molds M are transported along a rail 26 in such a manner that the molds M are passed one by one successively through the various processing chambers. Means for moving the molds M comprises an intermittently operable push rod 27. Two spacers S are arranged between each pair of adjacent molds M, and are movable together with the molds M. The push rod 27 intermittently pushes the mold M or the spacer S at the left-hand end as viewed in FIG. 15, whereby all the molds M and the spacers S are moved intermittently to the right along the rail 26. The mold M and the spacer S are introduced into the insertion chamber from below, and are taken out of the takeout chamber from above. In FIG. 15, the reference numerals 28 and 29 designate bell jars respectively. The reference numeral 30 designates a pressing rod within the first press chamber, while the reference numeral 31 denotes a pressing rod within the second press chamber.

Further, the number and the layout of the temperature regulating chambers can suitably vary depending upon the glass articles to be molded. Moreover, a plurality of groups of molds may be employed. That is, each group includes a plurality of molds each of which contains a glass preform. The plurality of groups of molds are conveyed group by group successively through the processing chambers. The plurality of molds of each group are processed simultaneously at each processing chamber. With such arrangement, it is possible to accelerate the molding speed considerably. In this case, the sample mounts on which the molds are mounted, and the pressing rods for pressing the molds are provided in plural in compliance with the number of the molds. Alternatively, the forward end of each of the sample mounts is formed into a bifurcated shape and, likewise, the forward end of each of the pressing rods is formed into a bifurcated shape. An example is shown in FIG. 16 in which a sample mount 32 is formed into a bifurcated shape. The sample mount 32 is mounted on the rotary table 2 in such a manner that a pair of bifurcated sections 32a and 32b are arranged in the rotational direction 33 of the rotary table 2. Each of the pressing rods 21 and 23 has a pressure plate 34 which is wide correspondingly to the bifurcated sample mount 32. In this connection, a pair of separate pressing rods 21 or 23 may be substituted for the pressure plate 34.

As described above, the arrangement of the invention is such that the first and second pressing positions are provided, and the mold is transferred from the first to second pressing positions without the glass to be molded being taken out of the mold. With such arrangement, the cycle time can be shortened, enabling the molding speed to be raised. It is also possible to prevent occurrence of defects in the surface configuration of the glass article, and occurrence of shifting or deviation of the central axis of the glass article. Further, in the invention, the first pressing and the second pressing are carried out respectively when the viscosity of the glass material is in the range of from $10^8$ to $10^{9.5}$ poises and in the range of from $10^{10.5}$ to $10^{12}$ poises. Thus, the thickness at the center of the pressed glass is substantially determined at the first pressing, and the glass is pressed only slightly at the second pressing, so that it is possible to bring the central thickness of the molded glass to a value within a predetermined range. Furthermore, since the second pressing is carried out at the glass viscosity within the range of from $10^{10.5}$ to $10^{12}$ poises, generation of recesses in the molded glass due to shrinkage thereof after the pressing can be avoided, even in case where a glass article large in diameter and large in thickness is molded, making it possible to obtain glass articles high in configuration accuracy.

What is claimed is:

1. A method of molding glass articles, comprising the steps of:
   preparing a mold having accommodated therein glass preform;
   carrying out a first pressing of the glass preform within said mold where a pressing stroke is restricted at a first pressing, when the glass preform has its viscosity within a range of from $10^8$ to $10^{9.5}$ poises; and
   transferring said mold having accommodated therein the pressed glass from said first pressing position to a second pressing position where a second pressing is carried out with respect to the pressed glass within said mold when the pressed glass has its viscosity within a range of from $10^{10.5}$ to $10^{12}$ poises.

2. A method according to claim 1, wherein said mold includes a sleeve, and a pair of cope and drag fitted in said sleeve, and wherein said transferring step includes the step of transferring said mold from said first pressing position to said second pressing position while the glass preform or pressed glass is accommodated in said mold.

3. A method according to claim 1, including the step of gradually cooling the mold after said second pressing has been carried out with respect to the pressed glass, under such a condition that only the weight of said cope is maintained onto the pressed glass, until the pressed glass has its viscosity which reaches at most $10^{13}$ poises.

4. An apparatus for molding glass articles, comprising:
 transport means for transporting a mold having accommodated therein a glass preform, along a predetermined transport path;
 first temperature regulating chamber means through which said predetermined transport path extends, said first temperature regulating chamber means regulating temperature of the glass preform within said mold so as to bring viscosity of the glass preform to a value within a range of from $10^8$ to $10^{9.5}$ poises;
 first press chamber means through which said predetermined transport path extends, said first press chamber means being arranged downstream of said first temperature regulating chamber means with reference to a transport direction of said mold, said first press chamber means defining a first pressing position on said predetermined transport path, said first press chamber means having pressing means for pressing the glass preform within said mold transported from said first temperature regulating chamber means to said first pressing position by said transport means;
 wherein said mold includes a sleeve, and a pair of cope and drag fitted in said sleeve, wherein said pressing means of said first press chamber means can be abutted against an end face of said sleeve so as to restrict a pressing stroke of said pressing means of said first press chamber means;
 second temperature regulating chamber means through which said predetermined transport path extends, said second temperature regulating chamber means being arranged downstream of said first press chamber means with reference to the transport direction of said mold, said second temperature regulating chamber means regulating the temperature of the pressed glass within said mold so as to bring the viscosity of the pressed glass to a value within a range of from $10^{10.5}$ to $10^{12}$ poises;
 second press chamber means through which said predetermined transport path extends, said second press chamber means being arranged downstream of said second temperature regulating chamber means defining a second pressing position on said predetermined transport path, said second press chamber means having pressing means for pressing the pressed glass within said mold transported from said second temperature regulating chamber means to said second pressing position by said transport means; and
 third temperature regulating chamber means through which said predetermined transport path extends, said third temperature regulating chamber means being arranged downstream of said second press chamber means with reference to the transport direction of said mold, said third temperature regulating chamber means cooling the pressed glass within said mold transported from said second press chamber means to said third temperature regulating chamber means by said transport means.

5. An apparatus according to claim 4, wherein said pressing means of said second press chamber means has its outer dimension smaller than an inner dimension of said sleeve so that said pressing means of said second press chamber means can pressurize the molded glass to a position closer to said drag of said mold than that where said pressing means of said first press chamber means is located at said first pressing position.

6. An apparatus according to claim 4, wherein said transport means includes a rotary table which is rotatable intermittently about an axis of said rotary table, said predetermined transport path being circular and extending in concentric relation to the axis of said rotary table, and wherein a plurality of molds each containing the glass preform or the pressed glass are mounted on said rotary table in at least one row along said predetermined transport path, the arrangement being such that when said rotary table rotates intermittently, said molds are transported along said predetermined transport path so as to pass successively through said various chamber means.

7. An apparatus according to claim 4, wherein said transport means includes at least one straight guide rail for guiding said molds, said guide rail defining said predetermined transport path, and a push rod for moving said molds along said guide rail.

8. An apparatus according to claim 4, wherein said transport means is so designed as to transport a plurality of groups of molds simultaneously along said predetermined transport path, each group including a plurality of molds, and each mold having accommodated therein the glass preform or pressed glass, and wherein said first press chamber means includes a plurality of pressing means corresponding in number to the plurality of molds in each group, and said second press chamber means includes a plurality of pressing means corresponding in number to the plurality of molds in each group.

9. An apparatus according to claim 4, wherein said pressing means of said second press chamber means can be abutted against an end face of said sleeve so as to restrict a pressing stroke of said pressing means of said second press chamber means.

10. An apparatus for molding glass articles, comprising:
 transport means for transporting a mold having accommodated therein a glass preform, along a predetermined transport path wherein said transport means includes a sample mount on which said mold can rest, said mold having a lower face formed therein with one of a recess and a projection, said sample mount having an upper face formed therein with the other of said recess and said projection capable of being fitted on said recess, said recess and said projection having their respective configurations common to various types of molds;
 first temperature regulating chamber means through which said predetermined transport path extends, said first temperature regulating chamber means regulating temperature of the glass preform within said mold so as to bring viscosity of the glass preform to a value within a range of from $10^8$ to $10^{9.5}$ poises;

first press chamber means through which said predetermined transport path extends, said first press chamber means being arranged downstream of said first temperature regulating chamber means with reference to a transport direction of said mold, said first press chamber means defining a first pressing position on said predetermined transport path, said first press chamber means having pressing means for pressing the glass preform within said mold transported from said first temperature regulating chamber means to said first pressing position by said transport means;

second temperature regulating chamber means through which said predetermined transport path extends, said second temperature regulating chamber means being arranged downstream of said first press chamber means with reference to the transport direction of said mold, said second temperature regulating chamber means regulating the temperature of the pressed glass within said mold so as to bring the viscosity of the pressed glass to a value within a range of from $10^{10.5}$ to $10^{12}$ poises;

second press chamber means through which said predetermined transport path extends, said second press chamber means being arranged downstream of said second temperature regulating chamber means defining a second pressing position on said predetermined transport path, said second press chamber means having pressing means for pressing the pressed glass within said mold transported from said second temperature regulating chamber means to said second pressing position by said transport means; and third temperature regulating chamber means through which said predetermined transport path extends, said third temperature regulating chamber means being arranged downstream of said second press chamber means with reference to the transport direction of said mold, said third temperature regulating chamber means cooling the pressed glass within said mold transported from said second press chamber means to said third temperature regulating chamber means by said transport means.

11. An apparatus according to claim 4, wherein said second temperature regulating chamber means includes a gradual cooling chamber and a soaking chamber which are arranged in the mentioned order with reference to the transport direction of said mold.

12. An apparatus according to claim 4, wherein said third temperature regulating chamber means includes a gradual cooling chamber and a rapid cooling chamber which are arranged in the mentioned order with reference to the transport direction of said mold.

13. An apparatus according to claim 4, wherein said first temperature regulating chamber means includes a heating chamber and a soaking chamber which are arranged in the mentioned order with reference to the transport direction of said mold.

* * * * *